US009920686B2

(12) United States Patent
Somhorst et al.

(10) Patent No.: US 9,920,686 B2
(45) Date of Patent: Mar. 20, 2018

(54) WATER-COOLED CHARGE AIR COOLER WITH INTEGRATED MULTI-STAGE COOLING

(71) Applicant: Halla Visteon Climate Control Corp., Daejeon (KR)

(72) Inventors: Leo Somhorst, Lower Camden (GB); Petr Fabian, Studenka (CZ); Ales Hana, Koprivnice (CZ); Marek Bursik, Novy Jicin (CZ); Tomas Sikora, Jablunkov (CZ)

(73) Assignee: HANON SYSTEMS, Daejeon-si (KR)

( * ) Notice: Subject to any disclaimer, the term of this patent is extended or adjusted under 35 U.S.C. 154(b) by 289 days.

(21) Appl. No.: 14/867,151

(22) Filed: Sep. 28, 2015

(65) Prior Publication Data

US 2017/0089253 A1    Mar. 30, 2017

(51) Int. Cl.
| | |
|---|---|
| *F28F 3/00* | (2006.01) |
| *F02B 29/04* | (2006.01) |
| *F01P 3/12* | (2006.01) |
| *F28F 3/02* | (2006.01) |
| *F28F 3/04* | (2006.01) |
| *F28D 9/00* | (2006.01) |
| *F28D 21/00* | (2006.01) |

(52) U.S. Cl.
CPC .......... *F02B 29/0443* (2013.01); *F01P 3/12* (2013.01); *F02B 29/0412* (2013.01); *F02B 29/0462* (2013.01); *F28D 9/0056* (2013.01); *F28F 3/025* (2013.01); *F28F 3/044* (2013.01); *F01P 2060/02* (2013.01); *F28D 2021/0082* (2013.01); *Y02T 10/146* (2013.01)

(58) Field of Classification Search
CPC .............. F02B 29/0443; F02B 29/0412; F02B 29/0462; F01P 3/12; F01P 2060/02; F28D 9/0056; F28D 2021/0082; F28F 3/025; F28F 3/044; Y02T 10/146
USPC ............... 165/148, 153, 164, 165, 166, 170, 165/DIG. 356, DIG. 464
See application file for complete search history.

(56) References Cited

U.S. PATENT DOCUMENTS

| | | | |
|---|---|---|---|
| D736,361 S | * | 8/2015 | Cole ........................ D23/323 |
| 9,531,045 B2 | * | 12/2016 | Girmscheid ........ H01M 10/625 |
| 2008/0041556 A1 | * | 2/2008 | Braun ................ F02B 29/0462 165/41 |
| 2012/0018127 A1 | | 1/2012 | Iwasaki |
| 2014/0216702 A1 | | 8/2014 | Vallee et al. |

(Continued)

FOREIGN PATENT DOCUMENTS

| | | |
|---|---|---|
| CZ | 20120944 A3 | 7/2014 |
| EP | 2737269 A1 | 6/2014 |

(Continued)

*Primary Examiner* — Justin Jonaitis
(74) *Attorney, Agent, or Firm* — James D. Miller; Shumaker, Loop & Kendrick, LLP

(57) ABSTRACT

A charge air cooler includes a plurality of plate assemblies. Each of the plate assemblies includes a unitary first plate and a unitary second plate. The first plate and the second plate each have a channel forming surface. The channel forming surface of the first plate cooperating with the channel forming surface of the second plate to form a first flow channel for receiving a first coolant and a second flow channel for receiving a second coolant. A plurality of fins is interposed between the plate assemblies.

20 Claims, 8 Drawing Sheets

(56) References Cited

U.S. PATENT DOCUMENTS

| | | | | |
|---|---|---|---|---|
| 2014/0246179 A1* | 9/2014 | Vallee | ..................... | F28F 13/08 |
| | | | | 165/109.1 |
| 2014/0318754 A1* | 10/2014 | Vallee | ..................... | F28F 3/044 |
| | | | | 165/166 |
| 2014/0345838 A1* | 11/2014 | Vallee | ..................... | F28F 3/044 |
| | | | | 165/170 |
| 2016/0003128 A1* | 1/2016 | Berger | ................ | F02B 29/0443 |
| | | | | 165/145 |
| 2016/0356205 A1* | 12/2016 | Braun | ................. | F02B 29/0443 |
| 2017/0167806 A1* | 6/2017 | Joyce | .................... | F28D 9/0093 |

FOREIGN PATENT DOCUMENTS

| | | | | |
|---|---|---|---|---|
| JP | S61055584 A | 3/1986 | | |
| JP | H08094274 A | 4/1996 | | |
| JP | 2015155692 A | 8/2015 | | |
| KR | 20030070943 A | 9/2003 | | |
| WO | WO 2014009537 A1 * | 1/2014 | .......... | F02B 29/0443 |

* cited by examiner

WATER-COOLED CHARGE AIR COOLER WITH INTEGRATED MULTI-STAGE COOLING

FIELD OF THE INVENTION

The invention relates to a charge air cooler, particularly to a water-cooled charge air cooler with integrated multi-stage cooling.

BACKGROUND OF THE INVENTION

As is commonly known, turbochargers and superchargers are used to boost an engine of a motor vehicle by compressing air prior to being received by cylinders of the engine. When the air is compressed by the turbocharger or the supercharger, the air is heated and a pressure of the air is increased. However, it is desirable for the air entering the engine, such as a diesel engine or a gasoline engine, to be cooled after exiting the turbocharger or the supercharger because cooler air will have an increased density that improves an efficiency of the engine. In certain situations, the cooling of the air may also facilitate engine management and eliminate the danger of pre-detonation of the air and a fuel prior to a timed spark ignition and militate against excessive wear or heat damage to an engine block of the engine.

Charge air coolers such as water-cooled charge air coolers (WCAC) can be used in the motor vehicle to cool the air that has been compressed by the turbocharger or the supercharger prior to entering the engine. Typically, for application specific needs such as space constraints in a vehicle, for example, WCACs utilize a coolant from a low temperature (LT) coolant circuit separate from a high temperature (HT) engine coolant circuit. The LT coolant circuit includes a designated secondary radiator to cool the coolant flowing therethrough. As the compressed air flows through the WCAC, heat is transferred between air compressed by the turbocharger or the supercharger and the coolant from the LT coolant circuit. However, the coolant from the LT coolant circuit may not effectively cool or control the compressed air to desired temperatures. For example, at high levels of turbocharger or supercharger boost with ambient air temperatures, maximum performance is required from the WCAC and a desired system performance may be limited by the LT coolant circuit.

To solve the problem of limited performance due to the LT coolant circuit, some prior art solutions have relied on increasing the size of the secondary radiator of the LT coolant circuit, which may occupy undesired space and/or decrease engine performance efficiency. Other solutions incorporate WCACs with multi-staged or cascaded cooling. The WCAC with multi-stage cooling utilizes a coolant from more than one source. For example, the WCAC with multi-stage cooling may incorporate the coolant from the LT coolant circuit and the coolant from the HT engine coolant circuit. The coolant from both the LT coolant circuit and the HT engine coolant circuit facilitates cooling the compressed air to desired temperatures so system performance and efficiency of the WCAC, and accordingly the engine, is maximized.

However, a WCAC with multi-staged cooling generally employs more than one cooler unit or heat exchange core: one for receiving the coolant from the HT engine coolant circuit and one for receiving the coolant from the LT coolant circuit. Additionally, the WCAC's with multi-stage cooling may include tube-style cooling units or heat exchange cores. These types of WCACs can become expensive and complex due to an increase in required components, may not meet package space requirements, and may lack desired durability.

It would therefore be desirable to provide a charge air cooler with integrated multi-stage cooling that minimizes manufacturing costs, minimizes complexity, maximizes durability, and maintains package size requirements, while maintaining or increasing a performance and an efficiency of the charge air cooler.

SUMMARY OF THE INVENTION

In accordance and attuned with the present invention, a charge air cooler with integrated multi-stage cooling that minimizes manufacturing costs, minimizes complexity, maximizes durability, and maintains package size requirements, while maintaining or increasing a performance and an efficiency of the charge air cooler has surprisingly been discovered.

According to an embodiment of the disclosure a plate for a charge air cooler is disclosed. The plate includes a unitary plate including a channel forming surface. A plurality of protrusions extend outwardly from the channel forming surface. The protrusions and channel forming surface cooperate to form at least a portion of a first flow channel and at least a portion of a second flow channel. The at least portion of the first flow channel is separate from the at least portion of the first flow channel.

According to another embodiment of the invention, a charge air cooler is disclosed. The charge air cooler includes a plurality of plate assemblies each including a unitary first plate and a unitary second plate. The first plate and the second plate each have a channel forming surface cooperating with each other to form a first flow channel for receiving a first coolant and a second flow channel for receiving a second coolant. A plurality of fins are interposed between the plate assemblies.

According to yet another embodiment of the invention, a charge air cooling system is disclosed. The charge air cooling system includes a first coolant circuit conveying a first coolant therethrough and a second coolant circuit conveying a second coolant therethrough. A charge air cooler is in fluid communication with the first coolant circuit and the second coolant circuit. A heat exchange assembly is disposed in the charge air cooler. The heat exchange assembly includes a plurality of plate assemblies and a plurality of fins interposed between the plate assemblies. Each of the plate assemblies include a unitary first plate and a unitary second plate. The first plate and the second plate each have a channel forming surface cooperating with each other to form a first flow channel for receiving the first coolant and a second flow channel for receiving the second coolant.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawing which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. The terms upper and lower are used for clarity only in reference to a position of a charge air cooler in a motor vehicle.

Figure 1:
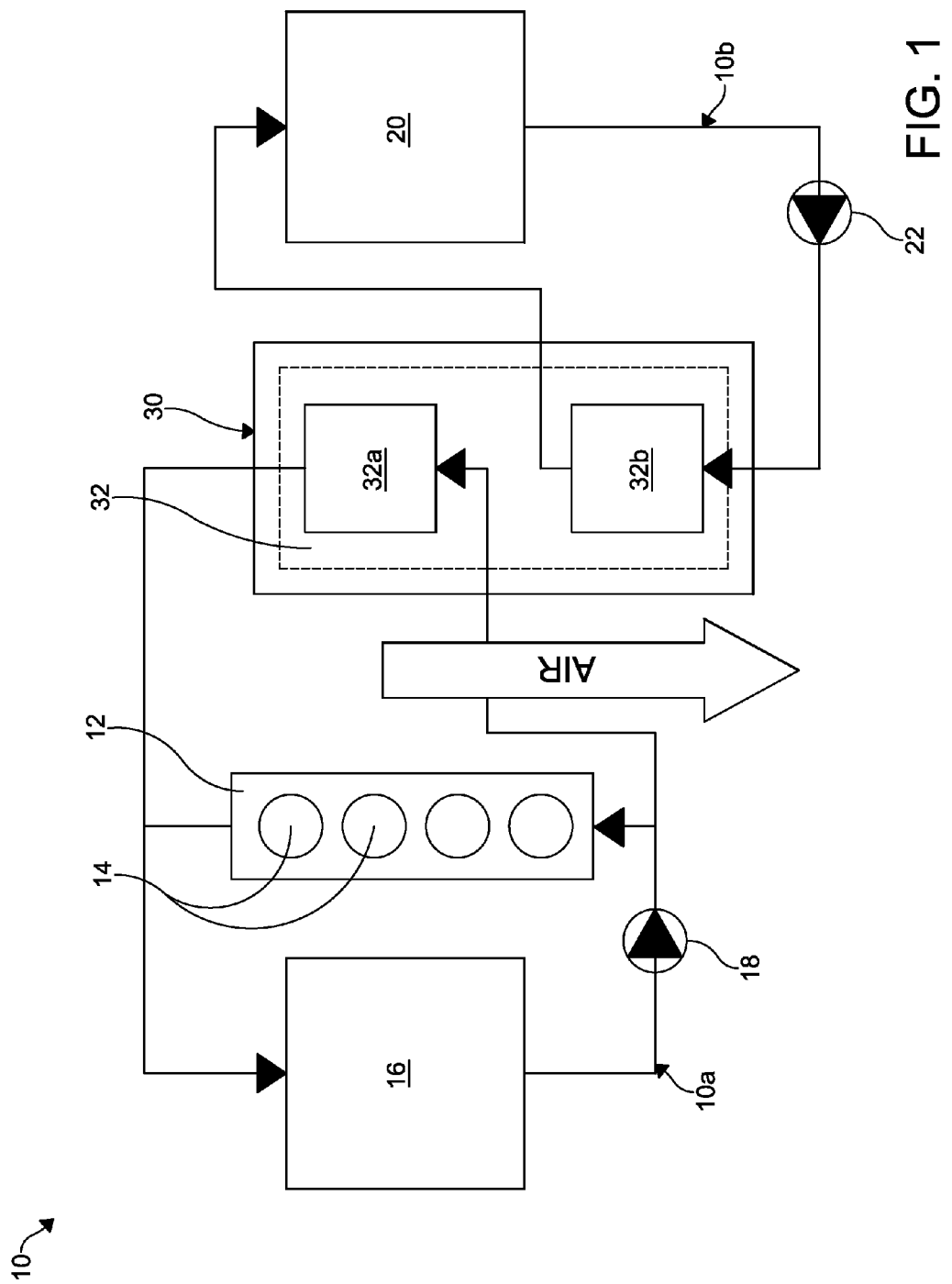
FIG. 1 is a schematic flow diagram of a charge air cooling system according to an embodiment of the invention.

FIG. 1 illustrates a charge air cooling system 10 of a motor vehicle according to an embodiment of the disclosure. The charge air cooling system 10 includes a first coolant circuit 10a for conveying a first coolant therethrough and a second coolant circuit 10b for conveying a second coolant therethrough. In certain embodiments, the first coolant circuit 10a is a high temperature (HT) coolant circuit such as an engine coolant circuit of the vehicle. The second coolant circuit 10b is a low temperature (LT) coolant circuit. It is understood that the first coolant circuit 10a and the second coolant circuit 10b can be any circuit conveying a coolant. The coolant can be any medium configured for heat exchange such as refrigerant, water, glycol, coolant, or a combination thereof; for example. In the illustrated embodiment of FIG. 1, a direction of a flow of the first coolant through the first coolant circuit 10a and a direction of a flow of the second coolant through the second circuit 10b is indicated by flow arrows.

The first coolant circuit 10a includes an engine 12 which may be configured as an internal combustion engine with a plurality of cylinders 14, a radiator 16, and a pump 18, all in fluid communication with each other. In the embodiment shown, the pump 18 is configured as a mechanical pump and regulates a flow of the first coolant through the engine 12 and consequently through the first coolant circuit 10a. It is understood other components such as control devices and systems and regulators (such as thermostats, valves, bypass circuits, for example) can be used in cooperation with the with the first coolant circuit 10a, as desired. It is further understood that other pump types can be used as desired such as electrical pumps, for example.

The second coolant circuit 10b includes a secondary radiator 20 and a secondary pump 22. In the embodiment shown, the secondary pump 22 is configured as an electrical pump to regulate a flow of the second coolant through the second coolant circuit 10b. However, it is understood the secondary pump 22 can be a mechanical pump, if desired. It is also understood other components such as control devices and systems and regulators (such as thermostats, valves, bypass circuits, for example) can be used in cooperation with the second coolant circuit 10b, as desired.

A charge air cooler 30 is disposed in the first coolant circuit 10a and configured to receive the first coolant therethrough. The charge air cooler 30 is also disposed in the second coolant circuit 10b and configured to receive the second coolant therethrough. The charge air cooler 30 is configured as a multi-stage water-cooled charge air cooler (WCAC) configured to receive and cool the air from a charge air circuit (not shown). The charge air circuit provides the air that has been charged from a charger such as a turbocharger or a supercharger, for example, to the engine 12 of the vehicle. A direction of the flow of the air through the charge air cooler 30 is indicated by an arrow labelled "AIR".

In the embodiment illustrated in FIG. 1, the charge air cooler 30 is disposed upstream of the radiator 16 with respect to the direction of the flow of the first coolant through the first coolant circuit 10a. The radiator 16 is disposed downstream of the engine 12 with respect to the direction of the flow of the first coolant of the HT circuit 10a and is configured to transfer heat from the first coolant to the atmosphere. The pump 18 regulates the flow of the first coolant flowing through the engine 12 and consequently through the first coolant circuit 10a. The charge air cooler 30 is in fluid communication with both the pump 18 and the radiator 16, wherein a flow path of the first coolant flowing through the engine 12 is disposed in parallel with a flow path of the first coolant flowing through the charge air cooler 30. However, it is understood that the flow path of the first coolant through the engine 12 can be configured in series with the flow path of the first coolant through the charge air cooler 30.

The charge air cooler 30 is disposed upstream of the secondary radiator 20 with respect to the direction of the flow of the second coolant through the second coolant circuit 10b. The secondary pump 22 regulates the second coolant flowing through the second coolant circuit 10b.

The charge air cooler 30 includes a unitary heat exchange assembly 32. A first portion 32a of the heat exchange assembly 32 receives the first coolant from the first coolant circuit 10a. A second portion 32b of the heat exchange assembly 32 receives the second coolant from the second coolant circuit 10b. In the embodiment shown in FIG. 1, a configuration of the charge air cooling system 10 is illustrated wherein the charge air cooler 30 is configured to receive coolant from two coolant sources (the first coolant circuit 10a and the second coolant circuit 10b). However, other configurations can be employed as desired. For example, the charge air charger 30 can be configured to receive coolant from additional coolant sources such as three, four, or five coolant sources, or more coolant sources, as desired.

Figure 2:
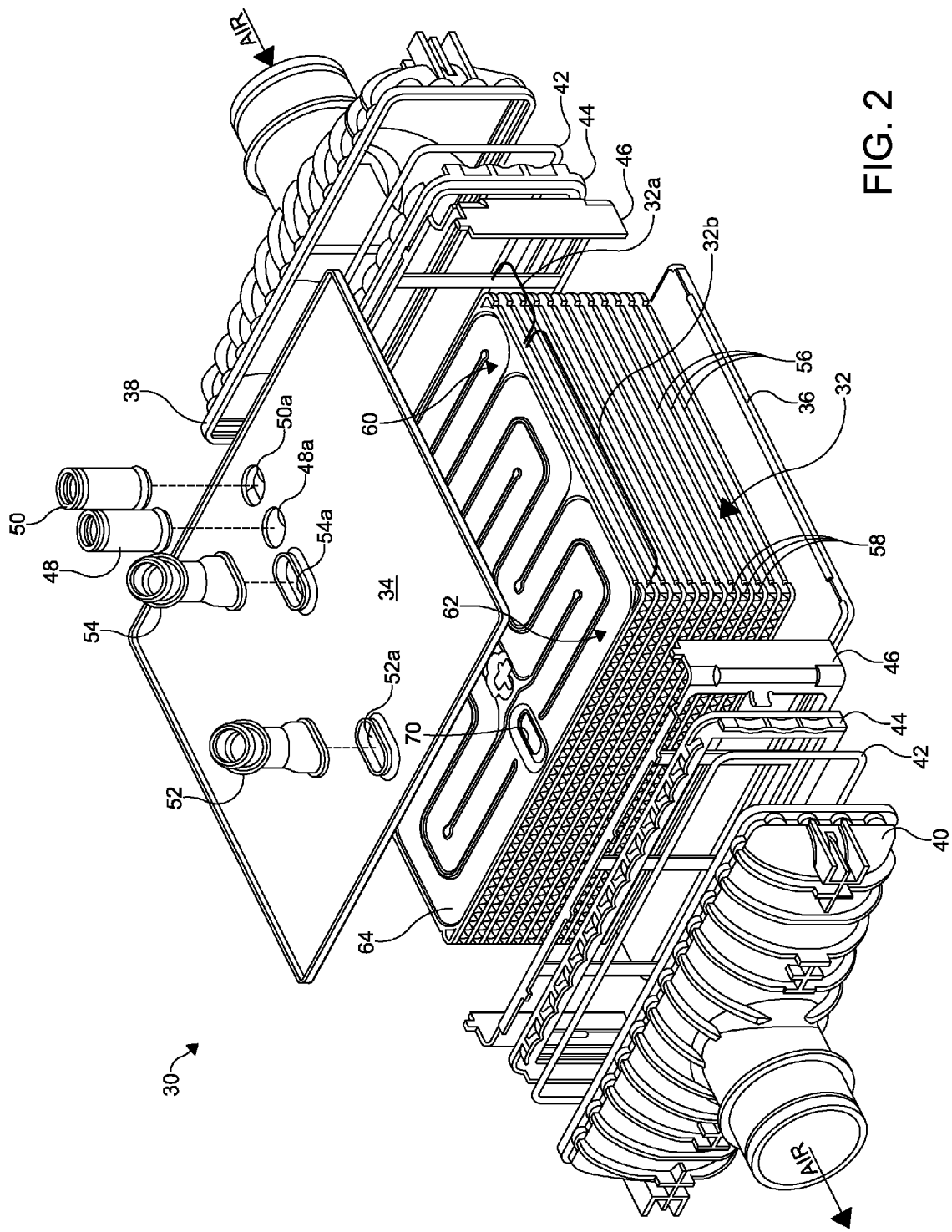
FIG. 2 is a partially exploded top perspective view of a charge air cooler of the charge air cooling system of FIG. 1 according to an embodiment of the invention.

In FIG. 2, the charge air cooler 30 according to an embodiment of the invention is illustrated. The charge air cooler 30 includes an inlet tank 38 and an outlet tank 40, for, respectively, receiving and conveying air flowing from the charge air circuit. A direction of the flow of charge air through the charge air cooler 30 is indicated by the solid arrow labelled "AIR". The heat exchange assembly 32 is disposed between an upper reinforcement cover 34 and a lower reinforcement cover 36. The heat exchange assembly 32 and the covers 34, 36 are disposed intermediate the inlet tank 38 and the outlet tank 40. It is understood, the charge air cooler 30 can have any assembly configuration, as desired. The charge air cooler 30 can also include other various components such as additional conduits, connections, tanks, valves, and any other components for use with a charge air cooler, as desired.

In certain embodiments, the charge air cooler 30 further includes a gasket 42, a header 44, and a frame 46 disposed between the heat exchange assembly 32 and each of the inlet tank 38 and the outlet tank 40. The gasket 42, the header 44, and the frame 46 cooperate with each other to facilitate coupling the heat exchange assembly 32 to the covers 34, 36 and to each of the inlet tank 38 and the outlet tank 40 and to militate against air leaking from the charge air cooler 30. Additional covers and/or housings can be employed to contain and protect the heat exchange assembly 32, as desired. It is understood, the charge air cooler 30 can have any assembly configuration as desired. For example, the charge air cooler 30 can include more or less than two tanks, employ various components.

The upper reinforcement cover 34 includes a first inlet port 48, a first outlet port 50, a second inlet port 52, and a second outlet port 54 disposed thereon. The first inlet port 48 is configured to receive the first coolant from the first coolant circuit 10a and the first outlet port 50 is configured to convey the first coolant to the first coolant circuit 10a. The second inlet port 52 is configured to receive the second coolant from the second coolant circuit 10b and the second outlet port 54 is configured to convey the second coolant to the second coolant circuit 10b. Each of first inlet port 48, the first outlet port 50, the second inlet port 52, and the second outlet port 54 align with respective openings 48a, 50a, 52a, 54b formed in the upper reinforcement cover 34. The ports 48, 50, 52, 54 can be integrally formed with the upper reinforcement cover 34 or separately formed from the upper reinforcement cover 34 and coupled thereto by welding, brazing, or the like.

Figure 3:
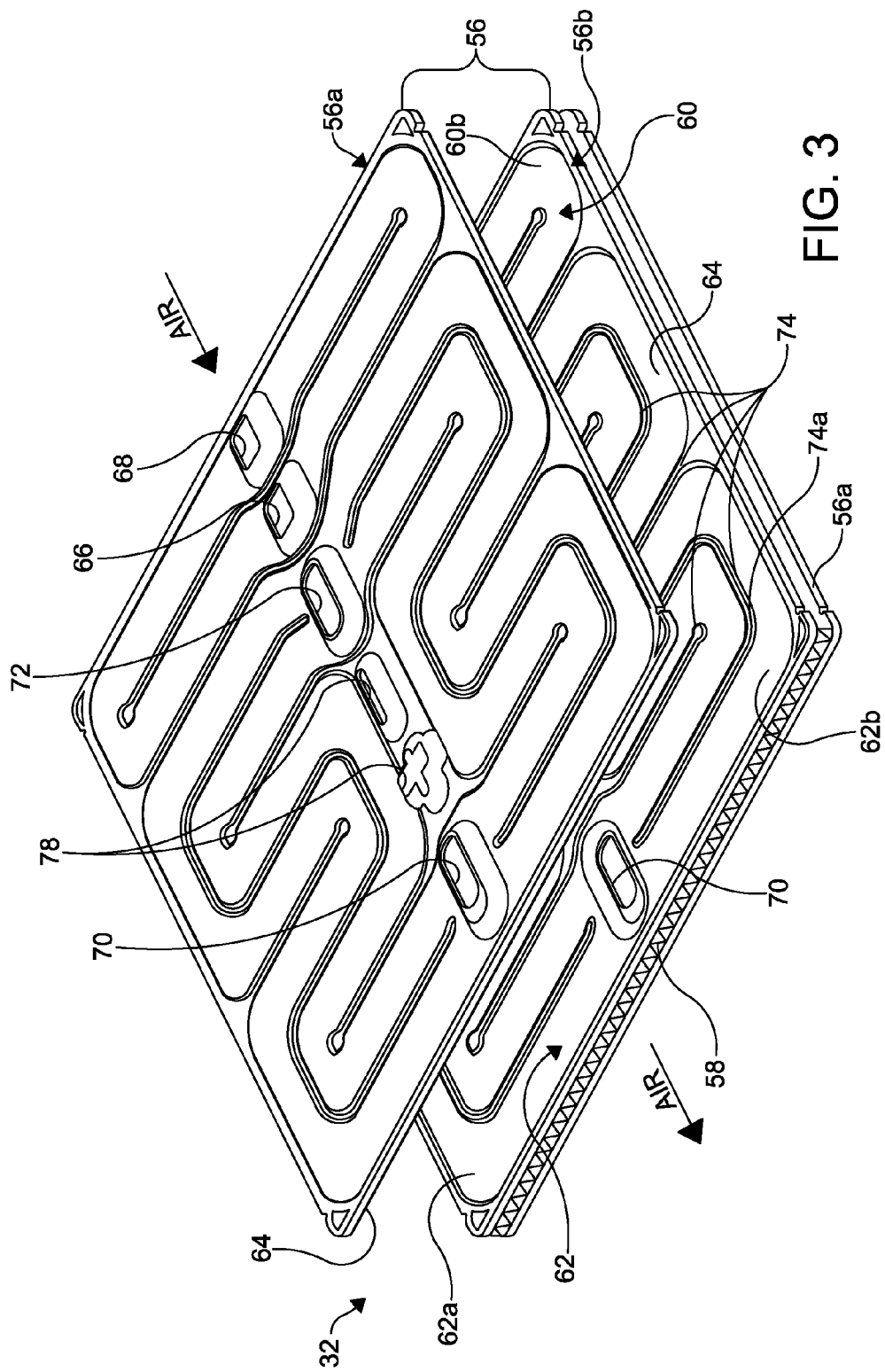
FIG. 3 is a partially exploded top perspective view of a portion of a heat exchange assembly of the charge air cooler of FIG. 2, wherein a plate assembly and fin arrangement is illustrated.

As illustrated in FIGS. 2-3, the heat exchange assembly 32 includes a plurality of stacked, substantially parallel plate assemblies 56 interposed between a plurality of substantially parallel fins 58. Each of the plate assemblies 56 defines a first flow channel 60 for receiving the first coolant from the first coolant circuit 10a and a second flow channel 62 for receiving the second coolant from the second flow circuit 10b. The first flow channels 60 are disposed in the first portion 32a of the heat exchange assembly 32 and the second flow channels 62 are disposed in the second portion 32b of the heat exchange assembly 32.

The plate assemblies 56 are disposed in the charge air cooler 30 so that the first flow channel 60 of each of the plate assemblies 56 is adjacent the inlet tank 38 and the second flow channel 62 of each of the plate assemblies 56 is adjacent the outlet tank 40. The fins 58 are in thermal communication with the plate assemblies 56 and are configured to allow the air flowing through the charge air cooler 30 to pass therebetween. The fins 58 are configured to facilitate heat transfer between the air flowing therethrough and each of the first coolant and the second coolant flowing through each of the plate assemblies 56. The fins 58 may have a corrugated shape, if desired.

Figure 4:
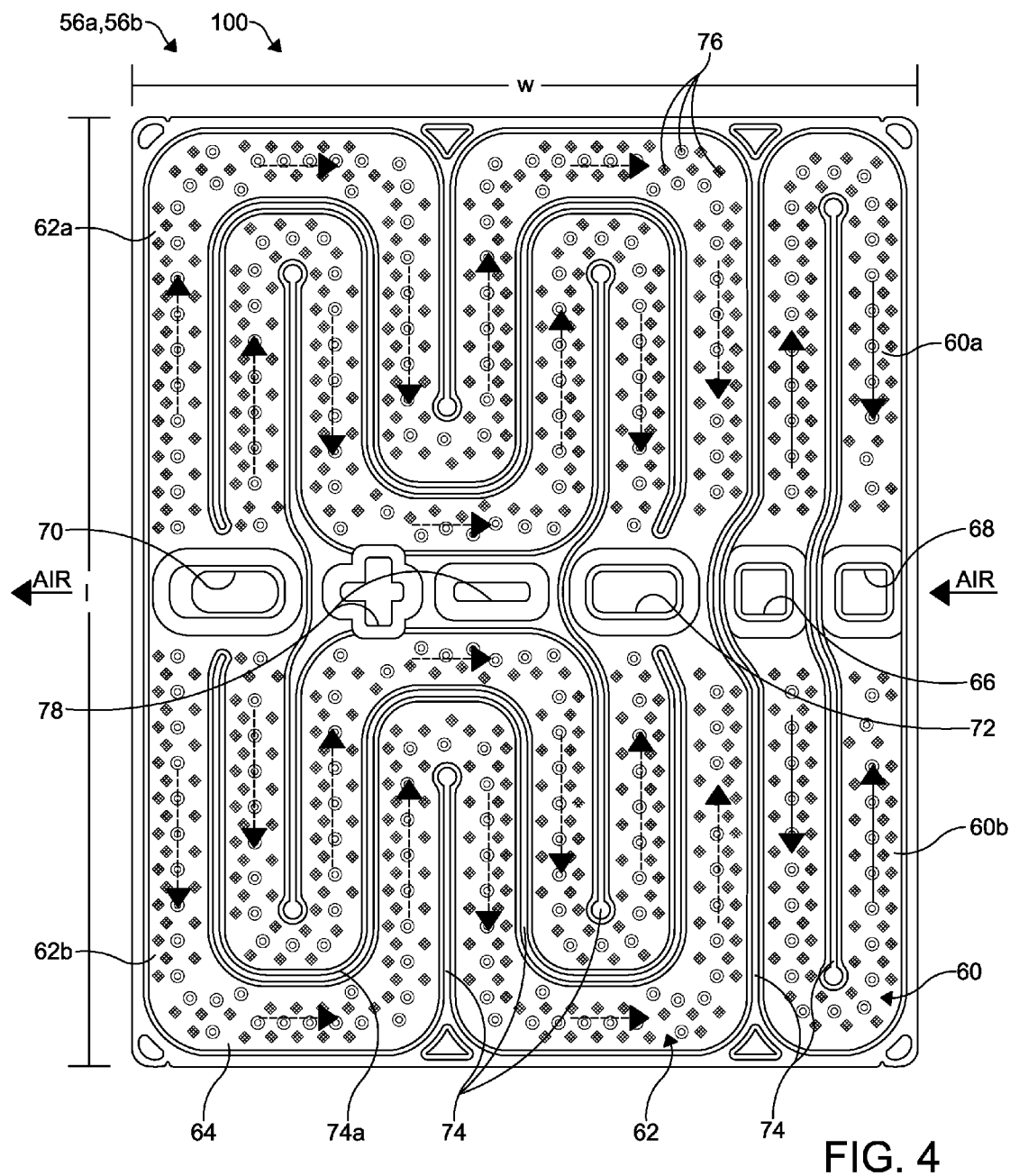
FIG. 4 is a top plan view of a plate of the charge air cooler of FIGS. 2-3, wherein flow turbulators formed on the plate are illsutrated.

As illustrated in FIGS. 3-4, each of the plate assemblies 56 includes a first plate 56a and a second plate 56b. Each of the plates 56a, 56b has a channel forming surface 64 with at least a portion of the channels 60, 62 formed thereon. The first plate 56a and the second plate 56b are joined together and cooperate with each other to form the flow channels 60, 62 therebetween, wherein channel forming surfaces 64 of each of the plates 56a, 56b face each other. Each of the plates 56a, 56b can be formed by any processes now known or later developed such as stamping, forming, molding, etc. The plates 56a, 56b can be joined together to form the plate assemblies 56 by any process such as brazing, adhesive bonding, or welding, for example.

Each of the plates 56a, 56b includes a first inlet aperture 66, a first outlet aperture 68, a second inlet aperture 70, and a second outlet aperture 72. The plate assemblies 56 are stacked so that the first inlet apertures 66 of each of the plates 56a, 56b align with each other to form a first inlet manifold extending through the plurality of plate assemblies 56. The first outlet apertures 68 of each of the plates 56a, 56b of the plate assemblies 56 align with each other to form a first outlet manifold extending through the plate assemblies 56. The second inlet apertures 70 of each of the plates 56a, 56b of the plurality of plate assemblies 56 align with each other to form a second inlet manifold extending through the plate assemblies 56. The second outlet apertures 72 of each of the plates 56a, 56b of the plurality of plate assemblies 56 align with each other to form a second outlet manifold extending through the plate assemblies 56.

The first inlet manifold and the first outlet manifold each receive the first coolant therethrough and are configured to fluidly communicate with the first inlet port 48 and the first outlet port 50 and the first channels 60 formed by each of the plate assemblies 56. The second inlet manifold and the second outlet manifold each receive the second coolant therethrough and are configured to fluidly communicate with the second inlet port 52 and the second outlet port 54 and the second channels 62 formed by each of the plate assemblies 56.

The first inlet aperture 66, the first outlet aperture 68, the second inlet aperture 70, and the second outlet aperture 72 are linearly aligned in each of the plates 56a, 56b along a width w thereof. In certain embodiments, the first inlet aperture 66, the first outlet aperture 68, the second inlet aperture 70, and the second outlet aperture 72 are linearly aligned in each of the plates 56a, 56b at a substantially central portion of each of the plates 56a, 56b with respect to a length/thereof.

Each of the plates 56a, 56b includes protrusions 74 formed thereon and extending from the channel forming surface 64 thereof. The protrusions 74 formed on the first plate 56a align and cooperate with the protrusions 74 formed on the second plate 56b of each of the plate assemblies 56 to define the first flow channel 60 and the second flow channel 62 and to separate the first flow channel 60 from the second flow channel 62. In certain embodiments, the protrusions 74 are arranged on the channel forming surface 64 and configured to form flow channels 60, 62 with substantially serpentine flow configurations. It is understood, however, the arrangement of the protrusions 74 can be configured to form other configurations of the flow channels 60, 62 such as concentric, zig-zag, linear, spiral, sporadic, or any other configurations or patterns as desired. The plates 56a, 56b can also include other assembly features 78 formed thereon configured to facilitate attachment of the plates 56a, 56b to each other and rigidity of the plates 56a, 56b when assembled in a stack in the heat exchange assembly 32.

In FIG. 4, one of the plates 56a, 56b of each of the plate assemblies 56 is shown to schematically illustrate a dual cross-flow path configuration 100. The direction of the flow of the first coolant through the first flow channel 60 is indicated by solid arrows and extends from the first inlet apertures 66 to the first outlet apertures 68. The direction of the flow of the second coolant through the second flow channel 62 is indicated by dashed arrows and extends from the second inlet apertures 70 to the second outlet apertures 72.

The first flow channel 60 includes a first flow path 60a and a second flow path 60b defined by the protrusions 74. Each of the first flow path 60a and the second flow path 60b extend laterally outwardly from and intermediate the first inlet aperture 66 and the first outlet aperture 68. The first flow path 60a and the second flow path 60b are symmetric with respect to each other about an axis that extends through the first inlet aperture 66 and the first outlet aperture 68. The second flow channel 62 includes a first flow path 62a and a second flow path 62b each extending laterally outwardly from and intermediate the second inlet aperture 70 and the second outlet aperture 70. The first flow path 62a and the second flow path 62b are symmetric with respect to each other about an axis that extends through the second inlet aperture 70 and the second outlet aperture 72.

The first flow path 60a and the second flow path 60b of the first flow channel 60 each include two parallel passes to direct the first coolant to flow along two parallel lengthwise portions of the plate 56a, 56b from the first inlet aperture 66 to the first outlet aperture 68. The first flow path 62a and the second flow path 62b of the second flow channel 62 each include four parallel passes to direct the second coolant to flow along four parallel lengthwise portions of the plate 56a, 56b from the second inlet aperture 70 to the second outlet aperture 72.

Portions of the protrusions 74 are configured as flow dividers 74a. Each of the first flow path 62a and the second flow path 62b of the second flow channel 62 include the flow dividers 74a formed therein to divide the flow paths 62a, 62b. In the embodiment illustrated, the flow dividers 74a divide each of the first flow path 62a and the second flow path 62b of the second flow channel 62 into two paths. However, it is understood that the flow dividers 74a can be configured to divide each of the first flow path 62a and the second flow path 62b into more than two flow paths such as three, four, or five flow paths, as desired. Additionally, it is understood, the first flow path 60a and the second flow path 60b of the first flow channel 60 can also be divided by the flow dividers 74a, if desired.

Each of the plates 56a, 56b can include flow turbulators 76 formed on portions of the channel forming surface 64 defining the flow channels 60, 62. The flow turbulators 76 facilitate a turbulent flow. The flow turbulators 76 can be dimples, protuberances, indentations, or any type of surface roughening, for example. The flow turbulators 76 can have any shape as desired such as rectangular, circular, triangular, elongate, for example. The turbulators 76 can have the same shape or varying shapes from each other. The heights or depths with respect to the channel forming surface 64 of each of the turbulators 76 can vary as desired. Additionally, the turbulators 76 can be formed on the channel foaming surface 64 in a prearranged geometrical pattern or random distribution.

For example, the turbulators 76 can be disposed at a fixed distance from each other and from the protrusions 74 forming the channels 60, 62. In another example, the turbulators 76 formed on the first plate 56a of each of the plate assemblies 56 can be alternately disposed with respect to the turbulators 76 formed on the second plate 56b of each of the plate assemblies 56. In a further example, the turbulators 76 formed on the first plate 56a of each of the plate assemblies 56 can also be aligned with respect to the turbulators 76 formed on the second plate 56b of each of the plate assemblies 56. Each of the flow turbulators 76 formed on the first plate 56a can be brazed to the corresponding turbulators 76 formed on the second plate 56b of the plate assembly 56, as desired.

With referred reference to FIGS. 1-4, in application, the first coolant, cooled by the radiator 16 of the first coolant circuit 10a, flows from the first coolant circuit 10a to the charge air cooler 30. The first coolant flows through the first inlet port 48 and the first inlet manifold formed by the plate assemblies 56 of the heat exchange assembly 32. The first coolant is then distributed amongst each of the plate assemblies 56 from the first inlet manifold. The flow of the first coolant is then divided into each of the flow paths 60a, 60b of the first flow channels 60 of each of the plate assemblies 56 and flows from the first inlet aperture 66 to the first outlet aperture 68. The first coolant is then directed to the first outlet manifold and through the first outlet port 50 to the first coolant circuit 10a.

As the first coolant flows through the first channels 60 of the plate assemblies 56, the second coolant, cooled by the secondary radiator 20 of the second coolant circuit 10b, flows from the second coolant circuit 10b to the charge air cooler 30 through the second inlet port 52 and the second inlet manifold formed by the plate assemblies 56 of the heat exchange assembly 32. The second coolant is then distributed from the second inlet manifold to each of the plate assemblies 56. The flow of the second coolant is divided into each of the flow paths 62a, 62b of the second flow channels 62 of each of the plate assemblies 56 and flows from the second inlet aperture 70 to the second outlet aperture 72. The second coolant is then directed to the second outlet manifold and through the second outlet port 50 to the second coolant circuit 10b.

Concurrently, as the first coolant and the second coolant respectively flow through the first flow channels 60 and the second flow channels 62 of the charge air cooler 30, the air from the charge air circuit flows through the heat exchange assembly 32. The air flows between each of plate assemblies 56 along the width w thereof and through the corrugated fins 58. As the air flows through the first portion 32a of the heat exchange assembly 32, heat is transferred between the first coolant flowing through the first flow channels 60 and the air. Thereafter, the air flows through the second portion 32b of the heat exchange assembly 32. Heat is further transferred between the second coolant flowing through the second flow channels 62 and the air.

Figure 5:
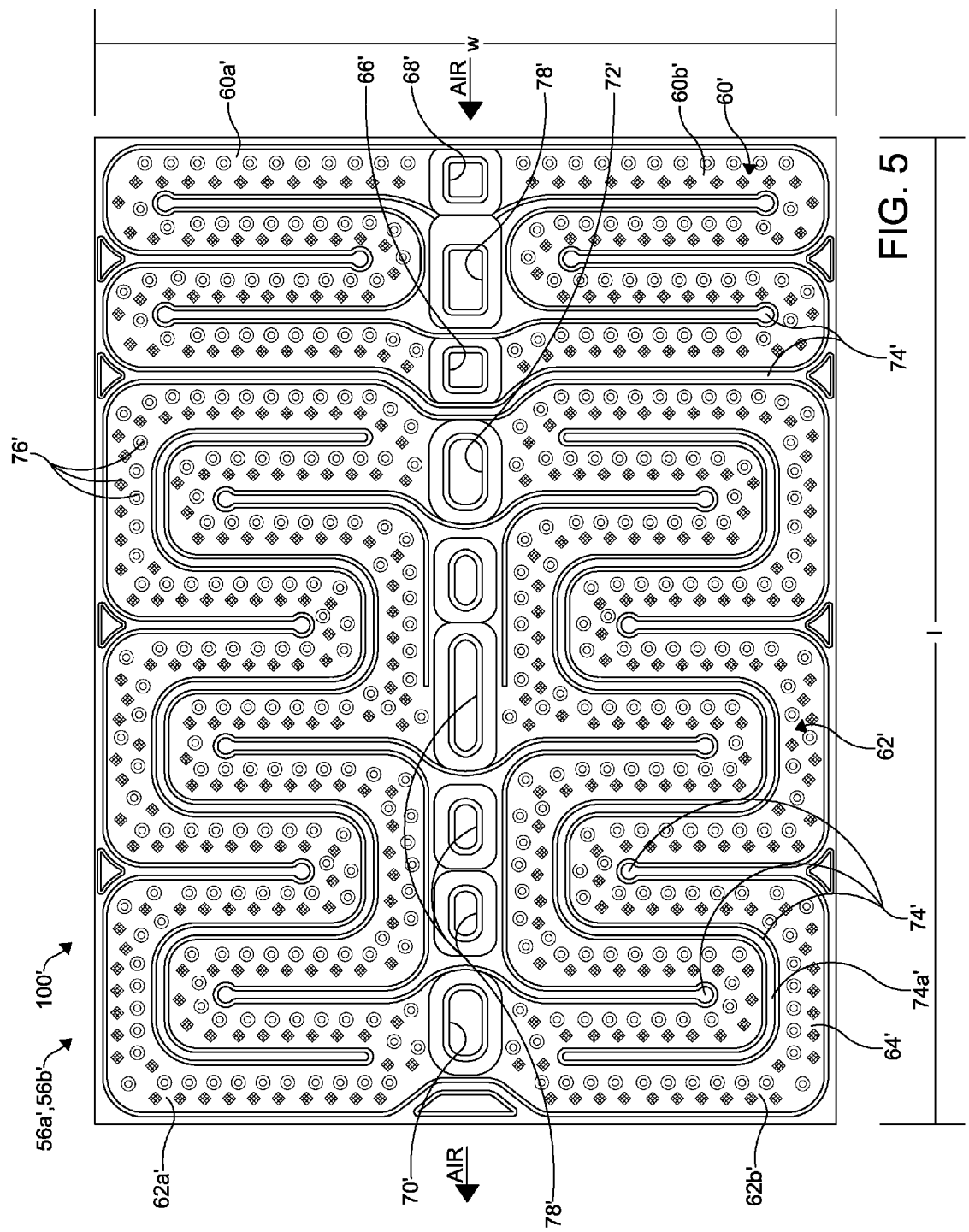
FIG. 5 is a top plan view of a plate of a charge air cooler according to another embodiment of the invention.

FIG. 5 illustrates one of the plates 56a', 56b' of each of the plate assemblies 56' having a dual cross-flow path configuration 100' according to another embodiment of the disclosure. Similar reference numerals are used to describe features substantially similar to those described in FIG. 4, except with a prime symbol (') placed after such reference numerals. The dual cross-flow path configuration 100' shown in FIG. 5 is substantially similar to the dual cross-flow path configuration 100 described hereinabove and illustrated in FIG. 4, except that each of the first flow path 60a' and the second flow path 60b' of the first flow channel 60' includes four parallel passes. The four passes direct the first coolant to flow along four parallel lengthwise portions of the plate 56a', 56b' from the first inlet aperture 66' to the first outlet aperture 68'. Each of the first flow path 62a' and the second flow path 62b' of the second flow channel 62' includes six parallel passes. The six passes direct the second coolant to flow along six parallel lengthwise portions of the plate 56a', 56b' from the second inlet aperture 70' to the second outlet aperture 72'. These configurations with a greater number of passes maximize heat transfer between the air and the first coolant and the air and the second coolant flowing through the charge air cooler 30.

It is understood, that the flow paths 60a', 60b' of the first flow channel 60' can have any flow configurations as desired such as a six-pass flow configuration and an eight-pass flow configuration, for example. The flow paths 62a', 62b' of the second flow channel 62' can have any flow configurations as desired such as a two-pass flow configuration and an eight pass flow configuration, for example. The flow paths 60a', 60b' of the first channels 60' can have varying flow configurations from or the same flow configurations to the flow paths 62a', 62b'.

Figure 6:
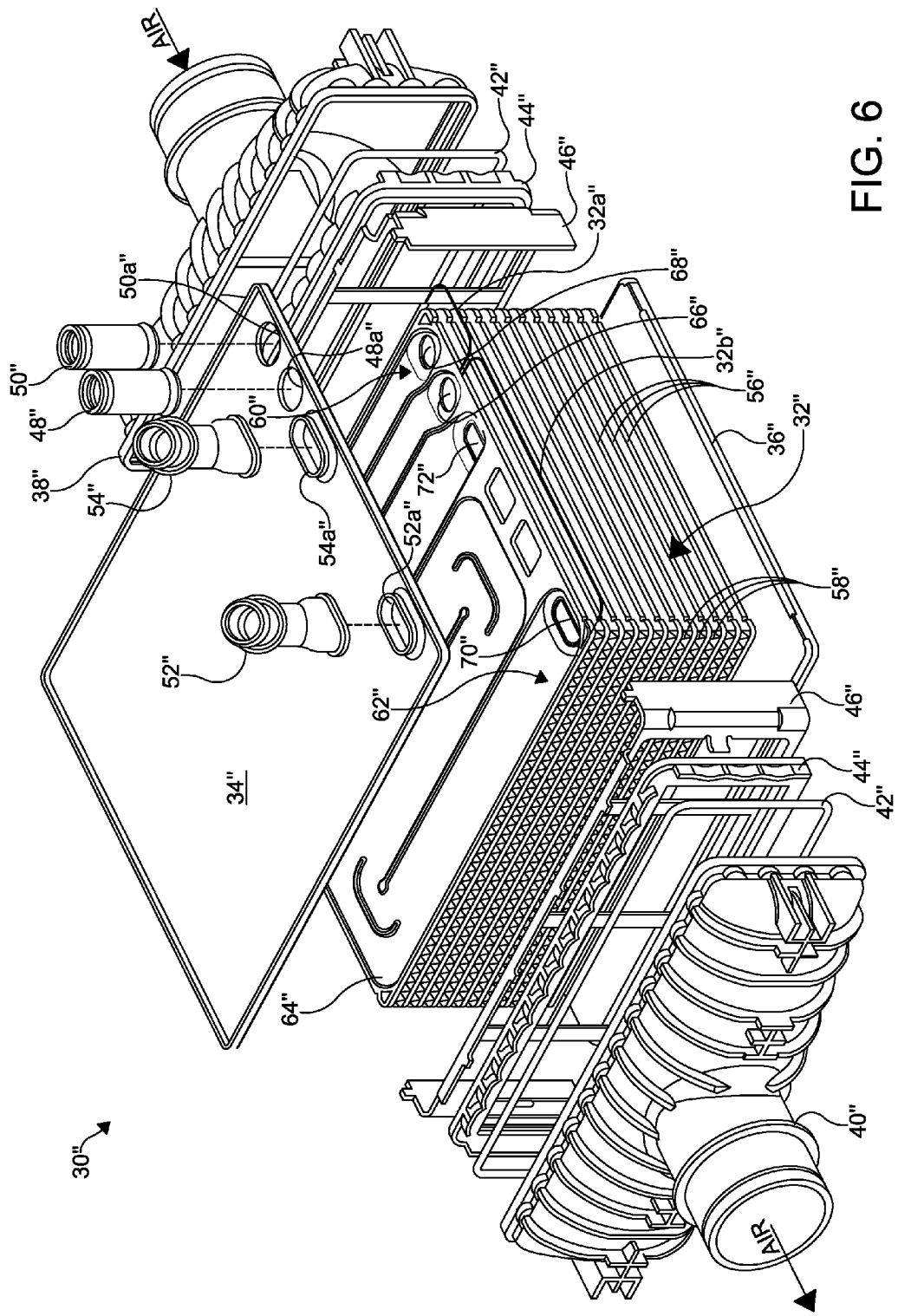
FIG. 6 is a partially exploded top perspective view of a charge air cooler of the charge air cooling system of FIG. 1 according to another embodiment of the invention.
Figure 7:
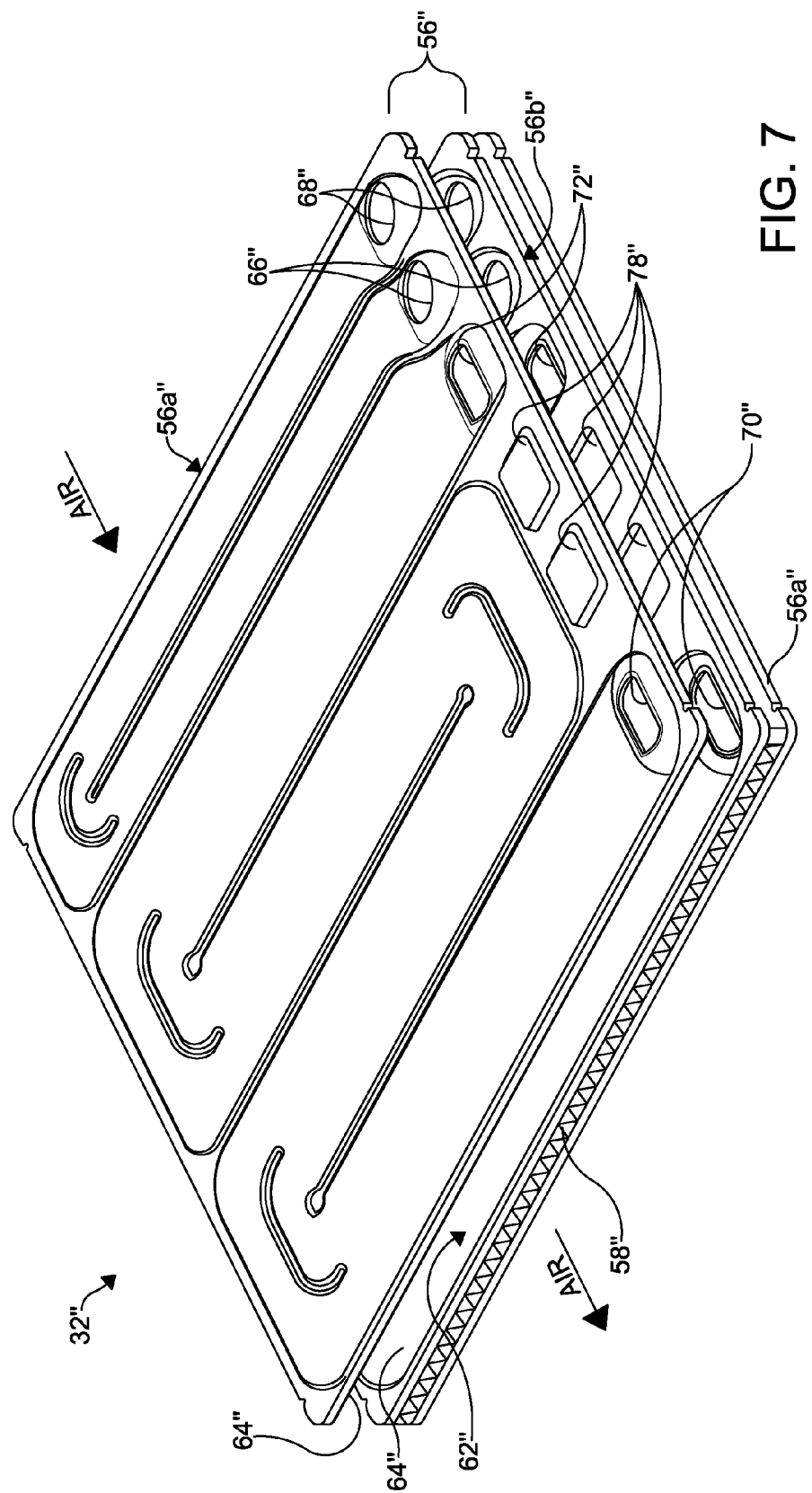
FIG. 7 is a partially exploded top perspective view of a portion of a heat exchange assembly of the charge air cooler of FIG. 6, wherein a plate assembly and fin arrangement is illustrated.
Figure 8:
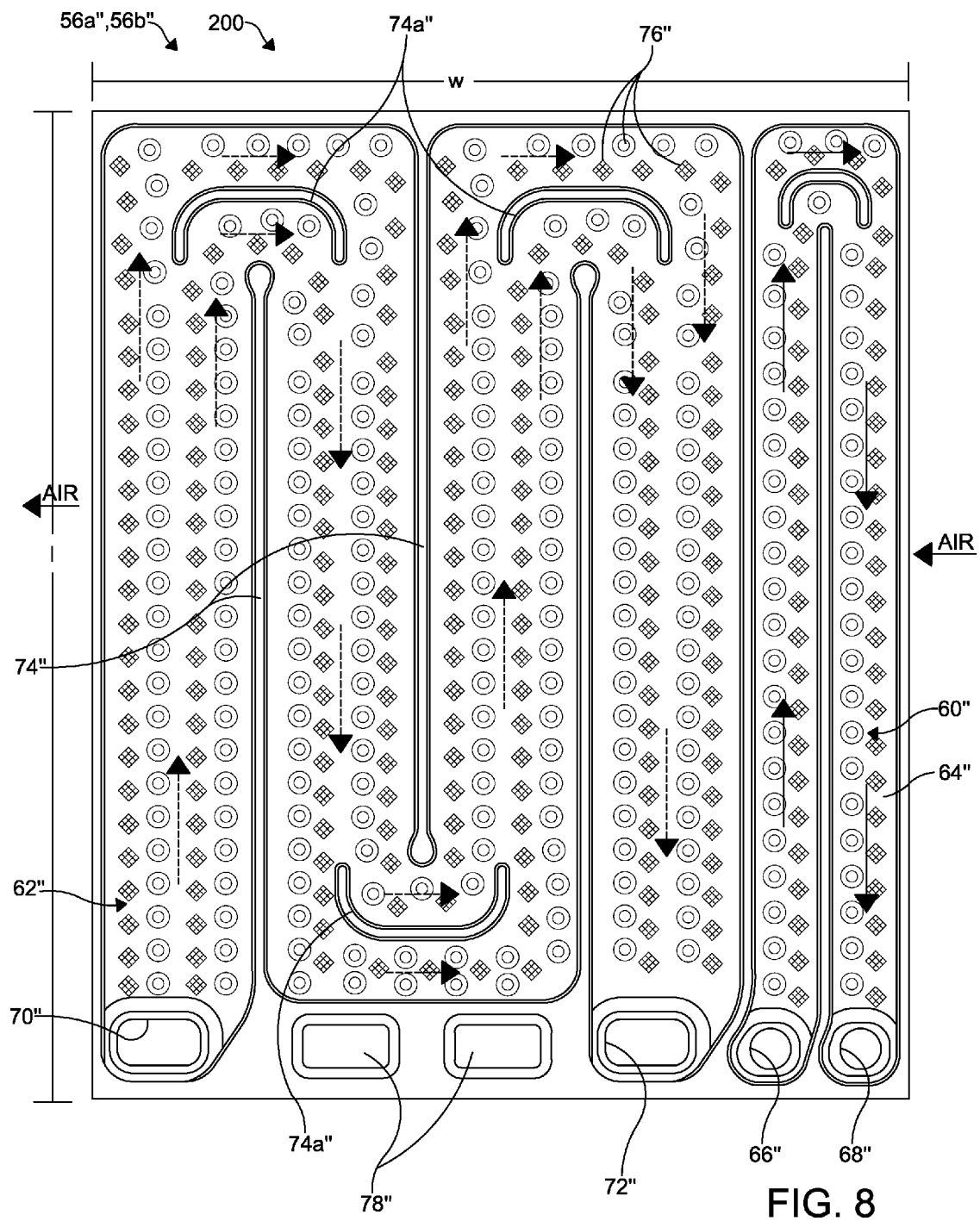
FIG. 8 is a top plan view of a plate of the charge air cooler of FIGS. 6-7, wherein flow turbulators formed on the plate are illsutrated.

FIGS. 6-8 illustrate a charge air cooler 30" according to another embodiment of the disclosure. Similar reference numerals are used to describe features substantially similar to those described in FIGS. 2-4, except with a double prime symbol (") placed after such reference numerals. The charge air cooler 30" shown in FIGS. 6-8 is substantially similar to the charge air cooler 30 described hereinabove and illustrated in FIGS. 2-4, except that each of the plates 56a", 56b" of the plate assemblies 56 have a single cross-flow configuration 200.

In the single cross-flow configuration, the first inlet aperture 66", the first outlet aperture 68", the second inlet aperture 70", and the second outlet aperture 72" are linearly aligned in each of the plates 56a", 56b" of each of the plate assemblies 56" along the width w thereof adjacent an edge of each of the plates 56a", 56b". The first flow channel 60" forms a single serpentine flow path extending from and intermediate the first inlet aperture 66" and the first outlet aperture 68". The second flow channel 62" forms a single serpentine flow path extending from and intermediate the second inlet aperture 70" and the second outlet aperture 72".

In certain embodiments, portions of each the first channel 60" and the second channel 62" can be divided by the flow dividers 74a" disposed on portions of the channel forming surface 64" defining the channels 60", 62". In the embodiment shown, the first flow channel 60" has a two-pass flow configuration and the second flow channel 62" has a four-pass flow configuration. However, it is understood that the first flow channel 60" and the second flow channel 62" can have any flow configuration as desired such as a six-pass configuration, eight-pass configuration or any other flow configuration as desired. In the single flow configuration 200 each of the plates 56a", 56b" can further include the flow turbulators 76" formed on the channel forming surface 64" thereof.

With referred reference to FIGS. 6-8, in application, the first coolant flows from the first coolant circuit 10a to the charge air cooler 30" through the first inlet port 48" and the first inlet manifold formed by the plate assemblies 56" of the heat exchange assembly 32". The first coolant is then distributed into each of the plate assemblies 56" from the first inlet manifold. The first coolant then flows through the first flow channels 60" of each plate assembly 56" from the first inlet apertures 66" to the first outlet apertures 68" thereof. The first coolant is then directed to the first outlet manifold and through the first outlet port 50" to the first coolant circuit 10a.

As the first coolant flows through the first channels 60" of the plate assemblies 56", the second coolant, cooled by the secondary radiator 20 of the second coolant circuit 10b, flows from the second coolant circuit 10b to the charge air cooler 30" through the second inlet port 52" and the second inlet manifold formed by the plate assemblies 56" of the heat exchange assembly 32". The second coolant is then distributed into each of the plate assemblies 56" from the second inlet manifold. The second coolant flows through the second flow channels 62" of each plate assembly 56" from the second inlet aperture 70" to the second outlet aperture 72". The second coolant is then directed to the second outlet manifold and through the second outlet port 50" to the second coolant circuit 10b.

Concurrently, as the first coolant and the second coolant respectively flow through the first flow channels 60" and the second flow channels 62" of the heat exchange assembly 32" of the charge air cooler 30", the air from the charge air circuit flows through the heat exchange assembly 32". The air flows between each of the plate assemblies 56" along the width w thereof and through the corrugated fins 58". As the air flows through the first portion 32a" of the heat exchange assembly 32, heat is transferred between the first coolant flowing through the first flow channels 60" and the air. Thereafter, the air flows through the second portion 32b" of the heat exchange assembly 32. Heat is further transferred between the second coolant flowing through the second flow channels 62" and the air.

In other embodiments, alternate plate configurations can be employed as desired. The first inlet apertures 66, 66', 66", the first outlet apertures 68, 68', 68", the second inlet apertures 70, 70', 70", and the second outlet apertures 72, 72', 72" can be formed in the plates 56a, 56a', 56a", 56b, 56b', 56b" at any position thereon. For example, the apertures 66, 66', 66", 68, 68', 68", 70, 70', 70", 72, 72', 72" can be linearly aligned with each other along a width w of the plates 56a, 56a', 56a", 56b, 56b', 56b" at a non-central portion thereof with respect to the length l of the plates 56a, 56a', 56a", 56b, 56b', 56b". Additionally, the apertures 66, 66', 66", 68, 68', 68", 70, 70', 70", 72, 72', 72" can be aligned with each other along the length l of the plates 56a, 56a' 56a", 56b, 56b', 56b". In other examples, the apertures 66, 66', 66", 68, 68', 68", 70, 70', 70", 72, 72', 72" can also be non-aligned, as desired and formed at varying positions of the plates 56a, 56a', 56a", 56b, 56b', 56b". Furthermore, the plates 56a, 56a', 56a", 56b, 56b', 56b" can be configured to receives more than two coolants from more than two coolant sources.

In a non-limiting example, the first flow channels 60, 60', 60" are defined by a portion of the plates 56a, 56b, 56a', 56b', 56a", 56b" having an area equal to about 25% of the total area of the plates 56a, 56b, 56a', 56b', 56a", 56b". The second flow channels 62, 62', 62" are defined by a portion of the plates 56a, 56b, 56a', 56b', 56a", 56b" having an area equal to about 75% of the total area of the plates 56a, 56b, 56a', 56b', 56a", 56b". The 25% to 75% ratio of areas of the first flow channels 60, 60', 60" to the second flow channels 62, 62', 62" facilitates optimal heat exchange between the heat exchange assembly 32, 32', 32" and the air flowing through the charge air cooler 30, 30', 30". However, other ratios can be contemplated, as desired.

Advantageously, the charge air cooler 30, 30', 30" includes plates 56a, 56b, 56a', 56b', 56a", 56b" that are unitary and configured for multi-stage cooling of the air flowing from the charge air circuit of the vehicle through the unitary heat exchange assembly 32, 32', 32". Multi-stage cooling militates against the need to increase the size of the secondary radiator 20 or the addition of further components such as additional heat exchange assemblies, for example. Each of the unitary plates 56a, 56b, 56a', 56b', 56a", 56b" is configured to form multiple flow channels for receiving both the first coolant from the first coolant circuit 10a and the second coolant from the second coolant circuit 10b therein.

During certain conditions, such as during a high boost pressure level from the turbocharger of the vehicle and at ambient temperatures, the incorporation of the first coolant from the first coolant circuit 10a and the second coolant from the second coolant circuit 10b facilitates maximized cooling of the air flowing through the charge air cooler 30, 30', 30" for increased engine performance. Alternatively, during a low boost pressure level from the turbocharger of the vehicle and at low ambient temperatures, the incorporation of the first coolant from the first coolant circuit 10a facilitates minimal cooling or even warming of the air through the charge air cooler 30, 30', 30". The minimal cooling or warming of the air minimizes a fluctuation of the temperatures of the air flowing through the charge air cooler 30, 30', 30". Minimized fluctuation of air temperatures results in improved thermal management of the engine 12 and fuel efficiency of the vehicle.

The charge air coolers 30, 30', 30" with the unitary plates 56a, 56b, 56a', 56b', 56a", 56b" configured for multi-stage cooling minimizes manufacturing and assembly costs, optimally maintains vehicle package size requirements, and achieves increased durability of the charge air coolers 30, 30', 30". The configuration of the charge air coolers 30, 30', 30" also maintains optimal condensate management thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A plate for a charge air cooler comprising:
a unitary plate including a channel forming surface;
a plurality of protrusions extending outwardly from the channel forming surface, the protrusions and the channel forming surface cooperating to form at least a portion of a first flow channel and at least a portion of a second flow channel separate from the at least portion of the first flow channel; and
at least one assembly feature formed on the channel forming surface, the at least one assembly feature configured to facilitate attachment of the unitary plate to a cooperating plate, wherein the at least one assembly feature provides rigidity to the unitary plate attached to the cooperating plate when assembled in a stack in the charge air cooler.

2. The plate of claim 1, wherein the protrusions are configured to form at least one of a dual cross-flow path configuration and a single cross-flow configuration.

3. The plate of claim 1, wherein the unitary plate includes a first inlet aperture, a first outlet aperture, a second inlet aperture, and a second outlet aperture formed therein, the first inlet aperture and the first outlet aperture in fluid communication with the at least a portion of the first flow channel, and the second inlet aperture and the second outlet aperture in fluid communication with the at least a portion of the second flow channel.

4. The plate of claim 3, wherein the first inlet aperture, the first outlet aperture, the second inlet aperture, and the second outlet aperture are linearly aligned with each other along a width of the unitary plate.

5. The plate of claim 4, wherein the unitary plate and the protrusions form a dual cross-flow path configuration, and wherein the first inlet aperture, the first outlet aperture, the second inlet aperture, and the second outlet aperture are formed in the unitary plate at a substantially central portion with respect to a length of the unitary plate.

6. The plate of claim 5, wherein the at least a portion of the first flow channel includes a first flow path and a second flow path each extending laterally outwardly from and intermediate the first inlet aperture and the first outlet aperture, and the at least a portion of the second flow channel includes a first flow path and a second flow path each extending laterally outwardly from and intermediate the second inlet aperture and the second outlet aperture.

7. The plate of claim 4, wherein the unitary plate and the protrusions form a single cross-flow configuration, and wherein the first inlet aperture, the first outlet aperture, the second inlet aperture, and the second outlet aperture are formed in the unitary plate adjacent an edge of the unitary plate.

8. The plate of claim 1, wherein the at least a portion of the first flow channel includes one of two parallel passes and four parallel passes and the at least a portion of the second flow channel includes one of four parallel passes and six parallel passes.

9. The plate of claim 1, wherein the at least a portion of the first flow channel and the at least a portion of the second flow channel are serpentine.

10. The plate of claim 1, wherein the protrusions include flow dividers disposed in and configured to divide at least one of the at least a portion of the first flow channel and the at least a portion of the second flow channel.

11. The plate of claim 1, wherein the unitary plate includes flow turbulators formed on portions of the channel forming surface forming the at least a portion of the first flow channel and the at least a portion of the second flow channel.

12. A charge air cooler comprising:
a plurality of stacked plate assemblies, each of the plate assemblies including a unitary first plate and a unitary second plate, the first plate and the second plate each having a channel forming surface and at least one assembly feature formed on the channel forming surface, the channel forming surface of the first plate cooperating with the channel forming surface of the second plate to form a first flow channel for receiving a first coolant and a second flow channel for receiving a second coolant, wherein the at least one assembly feature of each of the first plate and the second plate is configured to facilitate attachment of the first plate to the second plate, and wherein the at least one assembly feature of each of the first plate and the second plate provides rigidity to a respective one of the plate assemblies in the plurality of stacked plate assemblies;
a plurality of fins, each of the fins interposed between adjacent ones of the plate assemblies;
an inlet tank coupled to a first end of the plurality of stacked plate assemblies, wherein the first flow channel is formed in a portion of each of the plate assemblies adjacent the inlet tank; and
an outlet tank coupled to a second end of the plurality of stacked plate assemblies, wherein the second flow channel is formed in a portion of each of the plate assemblies adjacent the outlet tank.

13. The charge air cooler of claim 12, wherein each of the first plate and the second plate have one of a dual cross-flow path configuration and a single cross-flow configuration.

14. The charge air cooler of claim 13, wherein each of the first plate and the second plate includes a first inlet aperture, a first outlet aperture, a second inlet aperture, and a second outlet aperture formed therein, the first inlet aperture and the first outlet aperture in fluid communication with the first flow channel, and the second inlet aperture and the second outlet aperture in fluid communication with the second flow channel.

15. The charge air cooler of claim 14, wherein the first inlet aperture, the first outlet aperture, the second inlet aperture, and the second outlet aperture are linearly aligned in each of the first plate and the second plate along a width thereof.

16. The charge air cooler of claim 12, wherein the first flow channel includes one of two parallel passes and four parallel passes and the second flow channel includes one of four parallel passes and six parallel passes.

17. The charge air cooler of claim 12, wherein the channel forming surfaces of each of the first plate and the second plate include a plurality of protrusions extending outwardly therefrom, the protrusions formed on the first plate of each of the plate assemblies align with the protrusions formed on the second plate of each of the plate assemblies to form the first flow channel and the second flow channel.

18. The charge air cooler of claim 12, wherein the channel forming surfaces of each of the first plate and the second plate include flow dividers extending outwardly therefrom, the flow dividers configured to divide at least a portion of at least one of the first flow channel and the second flow channel.

19. The charge air cooler of claim 12, wherein the first flow channel and the second flow channel are serpentine, and wherein each of the first plate and the second plate include flow turbulators formed on portions of the channel forming surface forming the first channel and the second channel, wherein the flow turbulators of the first plate of each of the plate assemblies one of align with and alternate with the flow turbulators formed on the second plate of each of the plate assemblies.

20. A charge air cooling system comprising:
a first coolant circuit conveying a first coolant therethrough;
a second coolant circuit conveying a second coolant therethrough; and
a charge air cooler in fluid communication with the first coolant circuit and the second coolant circuit, the charge air cooler including a heat exchange assembly, the heat exchange assembly including a plurality of stacked plate assemblies and a plurality of fins interposed between the plate assemblies, each of the plate assemblies include a unitary first plate and a unitary second plate, the first plate and the second plate each having a channel forming surface and at least one assembly feature formed on the channel forming surface, the channel forming surface of the first plate cooperating with the channel forming surface of the second plate to form a first flow channel for receiving the first coolant and a second flow channel for receiving the second coolant, wherein an inlet tank is coupled to a first end of the heat exchange assembly and an outlet tank is coupled to a second end of the heat exchange assembly, the first flow channel formed in a portion of each of the plate assemblies adjacent the inlet tank and the second flow channel formed in a portion of each of the plate assemblies adjacent the outlet tank, wherein the at least one assembly feature of each of the first plate and the second plate is configured to facilitate attachment of the first plate to the second plate, and wherein the at least one assembly feature of each of the first plate and the second plate provides rigidity to a respective one of the plate assemblies in the plurality of stacked plate assemblies.

* * * * *